United States Patent [19]

Williamson

[11] Patent Number: 5,626,053
[45] Date of Patent: May 6, 1997

[54] FLOATLESS GAUGE WITH RESISTIVE/ CONDUCTIVE POLYMER

[75] Inventor: Cecil M. Williamson, Carrollton, Tex.

[73] Assignee: Rochester Gauges, Inc., Dallas, Tex.

[21] Appl. No.: 648,592

[22] Filed: May 16, 1996

Related U.S. Application Data

[62] Division of Ser. No. 509,833, Aug. 1, 1995, which is a division of Ser. No. 158,036, Nov. 24, 1993, Pat. No. 5,501,102.

[51] Int. Cl.$^6$ .............. G01F 23/24; H01C 7/00; H01C 10/06
[52] U.S. Cl. .............. 73/304 R; 338/13; 338/94
[58] Field of Search .............. 273/304 R; 338/13, 338/94

[56] References Cited

U.S. PATENT DOCUMENTS

| | | | |
|---|---|---|---|
| 829,161 | 8/1906 | Kjerulff | 73/304 R |
| 1,304,022 | 5/1919 | Cole. | |
| 1,316,341 | 9/1919 | Vosika. | |
| 1,532,871 | 4/1925 | Bloch | 73/304 R |
| 2,894,390 | 7/1959 | Talbot | 73/304 R |
| 2,992,560 | 7/1961 | Morgan et al. | 73/317 |
| 3,113,282 | 12/1963 | Coleman | 338/33 |
| 3,132,331 | 5/1964 | Boddy | 340/244 |
| 3,179,920 | 4/1965 | McGinty | 73/304 R |
| 3,266,312 | 8/1966 | Coleman et al. | 73/313 |
| 3,326,042 | 6/1967 | Ross et al. | 73/290 |
| 3,364,321 | 1/1968 | Gessner | 200/83 |
| 3,688,795 | 9/1972 | Taylor | 137/558 |
| 3,709,038 | 1/1973 | Werner | 73/313 |
| 3,739,641 | 6/1973 | Taylor et al. | 73/313 |
| 3,969,941 | 7/1976 | Rapp | 73/290 R |
| 3,972,235 | 8/1976 | Frayer | 73/311 |
| 4,223,190 | 9/1980 | Olson | 200/84 R |
| 4,466,284 | 8/1984 | Dumery | 73/313 |
| 4,513,617 | 4/1985 | Hayes | 73/313 |
| 4,554,494 | 11/1985 | Howeth | 318/482 |
| 4,569,786 | 2/1986 | Deguchi. | |
| 4,641,523 | 2/1987 | Andreasson | 73/313 |
| 4,688,587 | 8/1987 | Bourgeon | 137/2 |
| 4,724,705 | 2/1988 | Harris | 73/313 |
| 4,749,981 | 6/1988 | Yui et al. | 338/225 |
| 4,778,957 | 10/1988 | Crowell | 200/84 R |
| 4,782,699 | 11/1988 | Gonze | 73/308 |
| 4,812,804 | 3/1989 | Masaki | 338/200 |
| 4,829,667 | 5/1989 | Thompson et al. | 29/858 |
| 4,835,509 | 5/1989 | Yoshino et al. | 338/32 R |
| 4,864,273 | 9/1989 | Tsuzuki et al. | 338/174 |
| 4,911,011 | 3/1990 | Fekete et al. | 73/313 |
| 4,967,181 | 10/1990 | Iizuka et al. | 340/450.2 |
| 4,987,400 | 1/1991 | Fekete | 338/164 |
| 5,050,433 | 9/1991 | Lumetta | 73/313 |
| 5,137,677 | 8/1992 | Murata | 264/272.16 |
| 5,138,881 | 8/1992 | Riley et al. | 73/304 R |
| 5,146,785 | 9/1992 | Riley | 73/313 |

FOREIGN PATENT DOCUMENTS

| | | | |
|---|---|---|---|
| 2549258A1 | 5/1977 | Germany | 73/304 R |
| 1380031 | 1/1975 | United Kingdom. | |

*Primary Examiner*—William A. Cuchlinski, Jr.
*Assistant Examiner*—Willie Morris Worth
*Attorney, Agent, or Firm*—Sidley & Austin

[57] ABSTRACT

A floatless liquid level gauge assembly utilizing polymeric resistive/conductive elements is provided which measures the liquid level of partially conductive or conductive liquids in a tank using a three terminal voltage divider network or a two terminal voltage or current network. The polymeric resistive/conductive element(s) extending into the tank and the liquid in the tank provide an electrical path which provides a signal proportional to the liquid level in the tank.

16 Claims, 4 Drawing Sheets

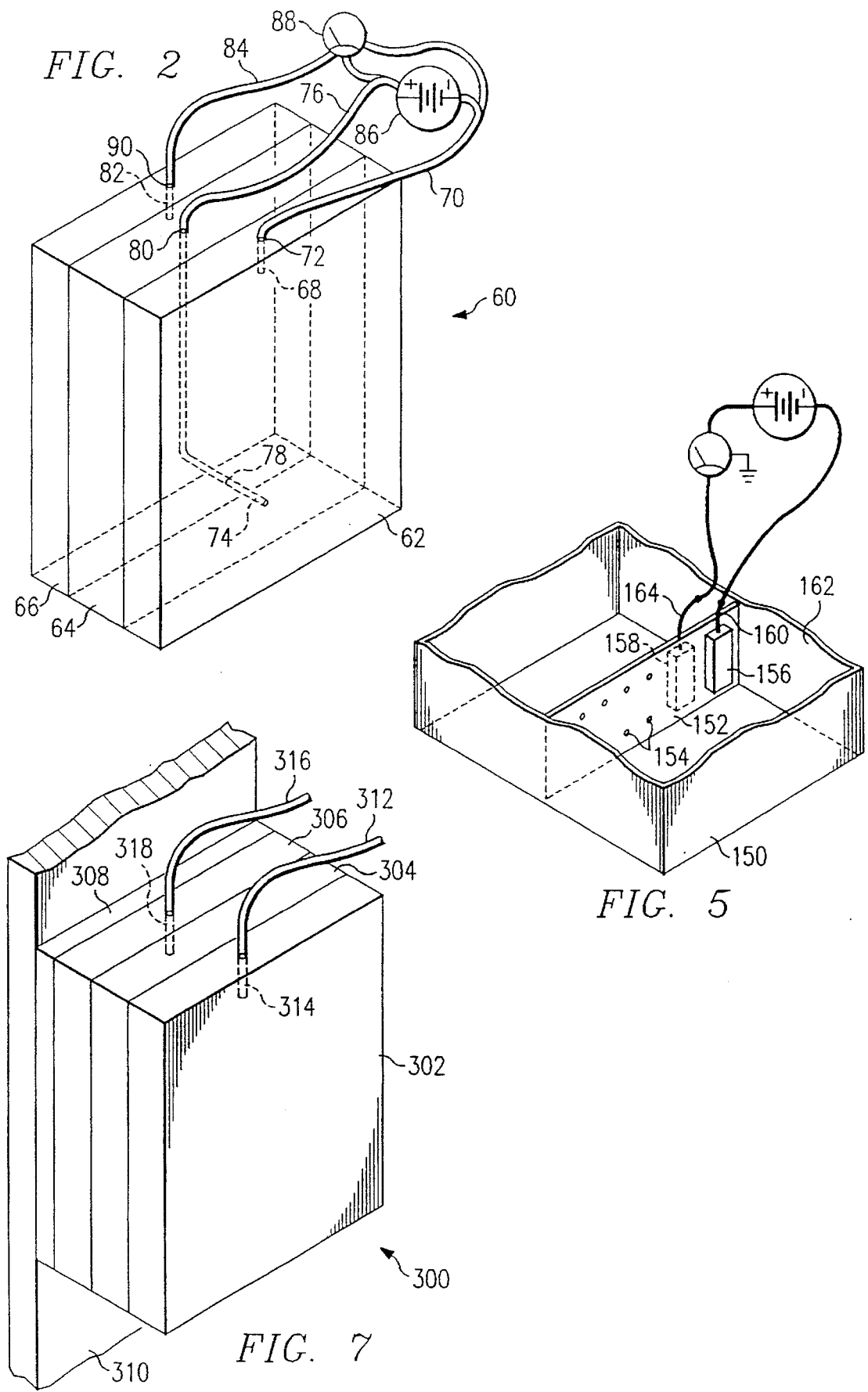

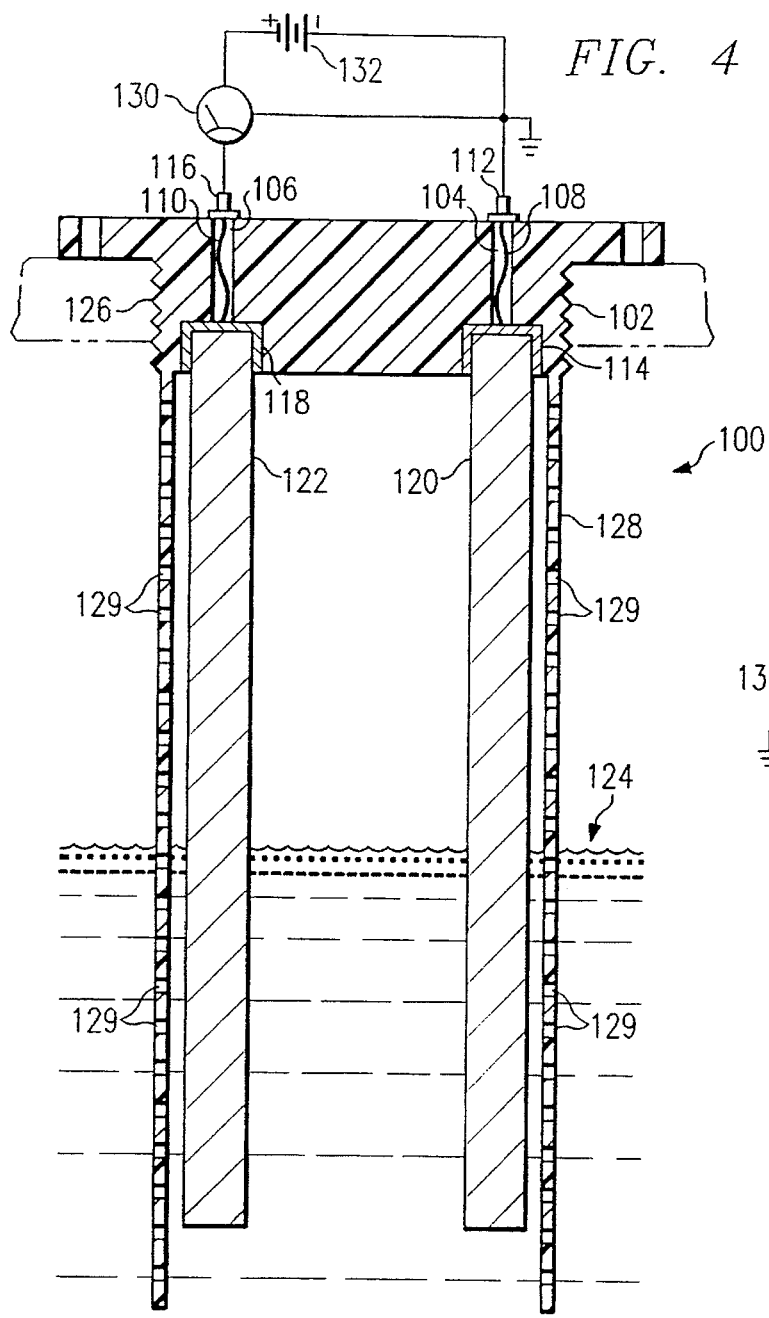
FIG. 4
FIG. 4A
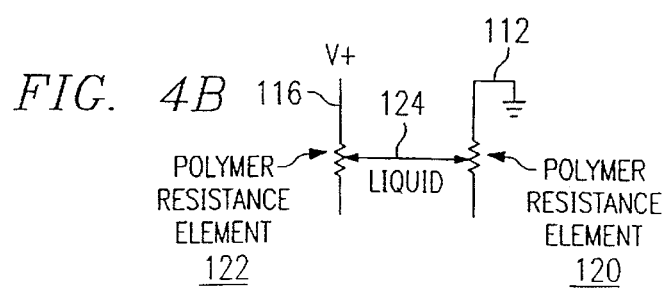
FIG. 4B

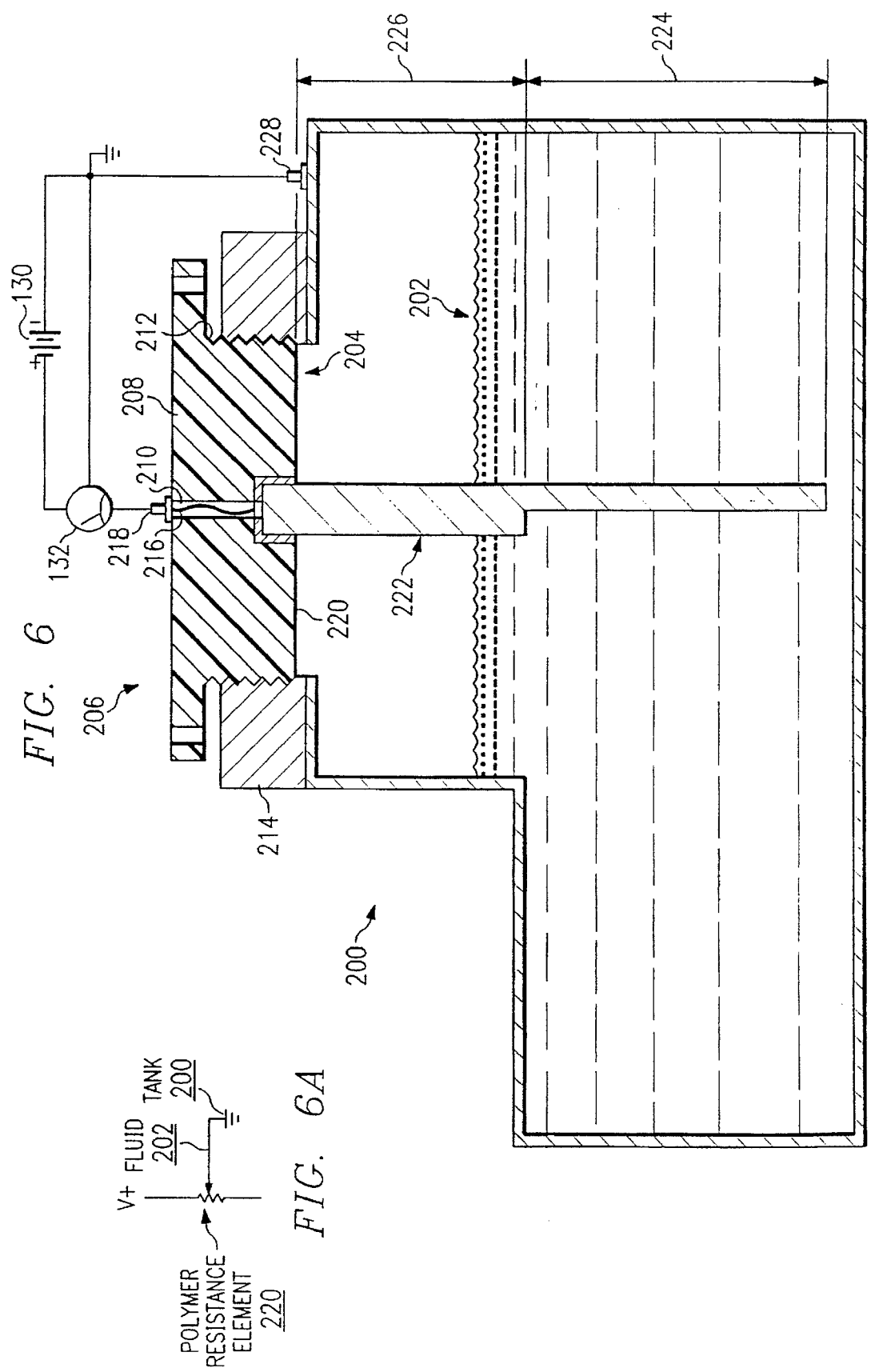

FLOATLESS GAUGE WITH RESISTIVE/CONDUCTIVE POLYMER

PRIORITY

This application is a divisional application of application Ser. No. 08/509,833 filed Aug. 1, 1995 which was a divisional application of application Ser. No. 08/158,036 filed Nov. 24, 1993, now issued as U.S. Pat. No. 5,501,102.

TECHNICAL FIELD OF THE INVENTION

This invention relates to gauges and in particular a floatless gauge which acts as a liquid level sender. In particular, the invention is particularly useful for measuring the liquid level of partially conductive and conductive fluids which can support corrosion.

BACKGROUND OF THE INVENTION

Gauges are well known in many different configurations for providing an indication of the fluid level in a vessel. Most gauges include a float mechanism which moves in response to changes in the liquid level in a tank. Typically the float mechanism is connected in a movable fashion to a resistive element. As the point of contact along the resistive element changes as the float moves in response to changes in liquid level, a signal can be generated indicating the liquid level.

Heretofore, one limiting factor on the life of gauges is corrosion when the gauges are in contact with liquids such as tap water, sea water, acids, bases, and liquid fertilizers, which support electric-chemical or chemical corrosion. Because most fluid, including gasoline, liquified propane and liquified methane, contain electrolytes such as water vapors and small amounts of water, galvanic and electrolytic reactions leading to corrosion of metals occurs. The corrosion potential limits application of gauges where metal resistive elements are immersed in the fluid, or in contact with vapors over the fluid. Furthermore, such units generally have the drawback that the resistive wire is a thin winding which presents a rough surface creating uneven friction loads and the possibility of lost contact with the float mechanism. Furthermore, such resistive wires are usually made of iron nickel alloy which is highly susceptible to electrochemical corrosion. This is especially problematic because such wires are typically of very thin gauge. Furthermore, small pieces of contamination on the wire can create discontinuity in the reading. Obviously, corrosion problems increase as the corrosive properties of fluid increase.

There has been a need to provide a gauge that overcomes the disadvantages or prior assemblies. Also, there has been a need for a gauge for use in highly corrosive materials such as liquid fertilizers and strong acids and bases. The gauge of the present invention eliminates the float mechanism and the variable contact point. Thus, the gauge is much simpler to construct, and has the advantage that there are no moving elements which can become stuck or impeded. The gauge of the present invention also has the advantage of a relatively long resistive area which allows greater resolution and precision. The gauge of the present invention also has advantages of extended life by eliminating moving parts, reduce costs by simpler design and greater flexibility in a number of applications. Another advantage of the present invention is that the length of the gauge elements and the cross sectional area of the elements can easily be equipped to accommodate different sizes of tanks without requiring change in electric components to provide readout of the fluid level. The gauge has the advantage of being easily constructed.

SUMMARY OF THE INVENTION

In one aspect, the present invention relates to an apparatus to be used in conjunction with the voltage source and voltage indicator for measuring the fluid level of either a partially conductive fluid or a conductive fluid contained in a tank or vessel. In one embodiment, the apparatus has an elongate electrically resistive/conductive polymeric member extending into the fluid with one end connected to the first terminal of the voltage source and the second end connected to a second terminal of the voltage source. A second elongate electrically resistive/conductive member is provided, also extending into the fluid, one end of which is connected to one terminal of a high impedance voltage indicator. The other terminal of the voltage indicator is connected to one of the terminals of the voltage source. Liquid bridging between the first and second elongate polymeric members forms part of the resistive electrical path.

Another aspect of the present invention relates to an apparatus to be used in conjunction with a voltage source and voltage indicator, or a current source and a current indicator for measuring the fluid level in a tank or vessel containing a conductive fluid. In another embodiment, the apparatus has a first elongate electrically resistive/conductive polymeric member extending into the fluid with one end connected to a first terminal of the voltage or current source. A second elongate electrically resistive/conductive polymeric member is provided, also extending into the fluid, one end of which is connected to one terminal of the indicator device.

In yet another aspect of the present invention, an apparatus is provided to be used in conjunction with a conductive tank. The apparatus has an elongate electrically resistive/conductive polymeric member extending into the fluid with one end connected to a first terminal of an indicator. This apparatus when mounted in a tank of conductive material and the conductive tank is connected to one terminal of a voltage source and to a second terminal of the indicator.

In another aspect, the present invention relates to a wide variety of shapes and configurations in which the resistive/conductive polymeric elements can be made to construct the gauge.

BRIEF DESCRIPTION OF THE DRAWINGS

The above and other advantages of the invention will become more apparent from the following description taken in conjunction with the accompanying drawings wherein like reference numerals refer to like parts.

FIG. 2, is an isometric view of an alternate embodiment of the present invention;

FIG. 4, is a cross-sectional view of another embodiment of the present invention;

FIG. 4A, is a simplified electrical circuit of FIG. 4;

FIG. 4B, is an illustrated sketch of an embodiment of the present which electrical circuity to form a current indicator;

FIG. 5, is another embodiment of the present invention in an isometric view;

FIG. 6, is a cross-section view of yet another embodiment of the present invention used in conjunction with a conductive tank;

FIG. 6A, is a simplified electrical circuit of FIG. 6; and

FIG. 7, is an isometric view of another embodiment of the present invention.

DETAILED DESCRIPTION OF THE INVENTION

In one embodiment the present invention relates to what is commonly referred to as the 3-wire gauge to be connected to a voltage indicator. The floatless gauge device of the present invention will operate in partially conductive fluids which have some electrical resistance or conductive fluids. Examples of partially conductive fluids include tap water, coffee, and radiator coolant mixtures. Examples of conductive fluids are battery acid, other strong acids and strong bases. The configuration of the gauge of the present invention may taken many forms.

Figure 1:
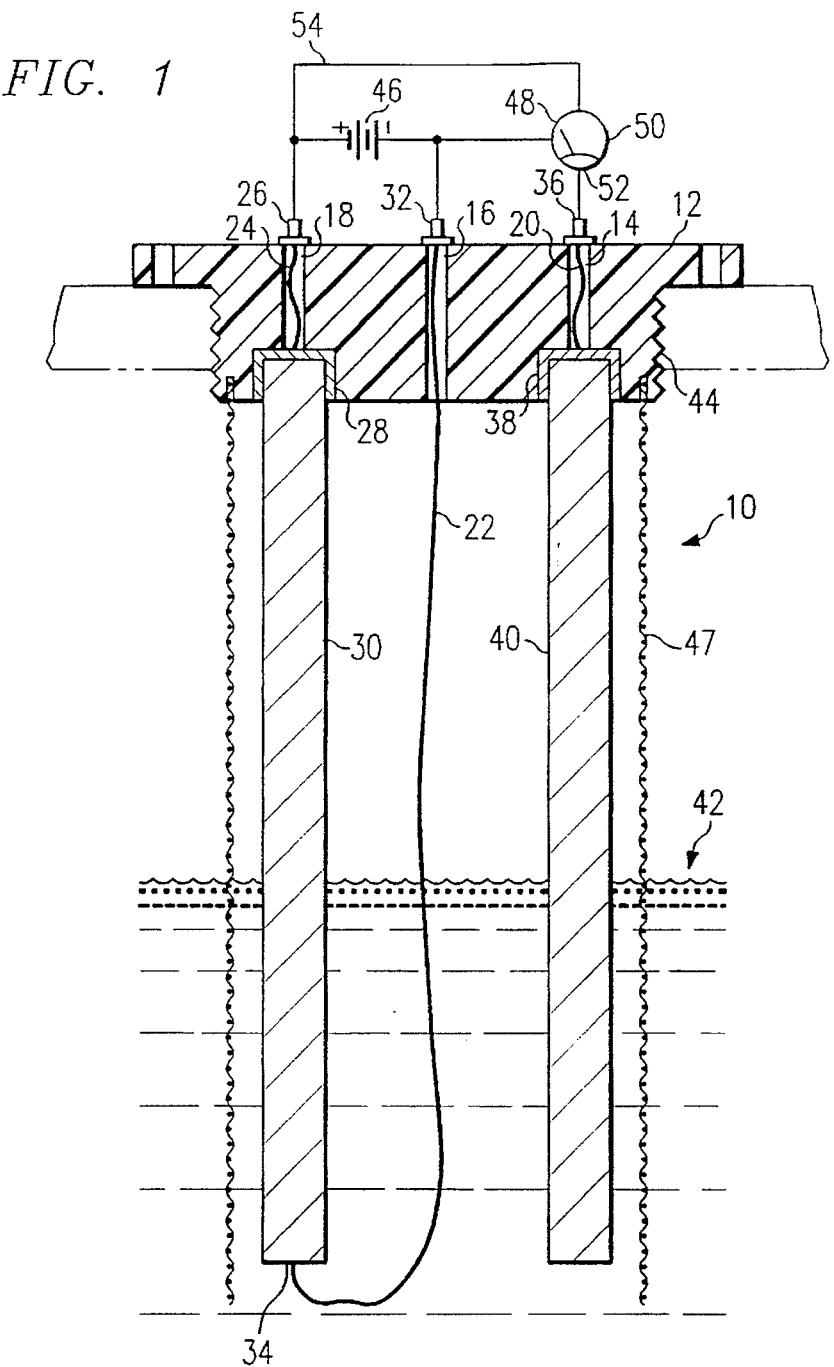
FIG. 1, is a cross-sectional view of one embodiment of the present invention.

In the first embodiment shown in FIG. 1, gauge assembly 10 has a base 12 defining a plurality of apertures therethrough 14, 16 and 18. Passing through apertures 14, 16 and 18 are electrical conductors 20, 22 and 24. Electrical conductor 24 on one end is connected to terminal 26 and at the other end connected to connector 28. Connector 28 is connected to the first end of first resistive/conductive polymeric elongate member 30. The term resistive/conductive polymeric member as used herein shall mean a polymer member having conductance or resistance properties useful in the present invention. The resistance of the elongate polymers is variable over a wide range. Such factors as gauge size, geometry, and receiver circuity will affect the selection of the resistance polymeric member.

Electrical conductor 22 at its first end is connected to terminal 32 and its second end 34 is connected to the second end of first resistive/conductive polymeric elongate member 30. Electrical conductor 20 on one end is connected to terminal 36 and at the other end connected to connector 38. Connector 38 is connected to the first end of second resistive/conductive polymeric elongate member 40. Thus, elongate members 30 and 40 extend from base 12 into the fluid 42. Base 12 is insulated from elongate elements 30 and 40 and connectors 28 and 38 by either insulating material or by constructing the base from an insulating material such as nonconductive plastic. Any suitable means to mount the gauge onto the tank (tank not shown) may be used such as threads 44. The first end of first resistive/conductive polymeric elongate member 30 is connected to the first terminal of voltage source 46. The second end of first resistive/conductive polymeric elongate member 30 is connected to end 34 of insulated electrical conductor 22 and thus is connected via insulated electrical conductor 22 to the second terminal of the voltage source 46 and to a first terminal 48 of voltage indicator 50. The first end of the second resistive/conductive polymeric elongate member 40 is connected to a second terminal 52 of voltage indicator 50 via electrical conductor 20. Conductor 54 connects the voltage indicator with the first terminal of the voltage source 46. A grounding shield 47 attached to base 12 and extending around elongate resistive/conductive polymeric members may be provided. The grounding shield is preferable when the assembly is used in a conductive tank, such as a metal tank, to provide a known ground for the gauge. The grounding shield may also serve as a baffle to dampen the movement of fluid in the tank. The grounding shield may be made of any suitable material such as wire mesh. The partially conductive fluid 42 contacting the two elongate members 30 and 40 completes an electrical path between elongate members 30 and 40 and allows the assembly to act as a voltage divider.

A unique benefit of the present invention is that it may be constructed in many shapes and sizes and can be of very durable construction because the first and second elongated resistive/conductive members 30 and 40 can be of a size which has good mechanical strength. The electrical properties of the gauge assembly can be widely varied to suit different applications and fluids. The relative geometry, i.e., the surface area of the elongate members, the distance between the first and second elongate members and the length of elongate members can be varied to effect performance of the gauge. Another unique advantage of this gauge assembly is that contamination is not a problem because minor contamination on the surface of the elongate resistive/conductive members has little effect over the large area of the members making electrical contact with the fluid. In contrast, a small area of contamination on the surface of a gauge which utilizes a float, a resistance coil of thin wire and a sliding wiper arm contacting the resistance wire is subject to discontinuities by small bits of contamination lying in the path of the wiper arm. It has been found that the gauge of the present invention surprisingly works well even as resistance of the partially conductive fluid changes, for example, the difference in conductivity between a mixture of tap water and alcohol and tap water alone does not significantly affect gauge performance.

FIG. 2 shows another embodiment representing the unique versatility of the gauge of the present invention. In FIG. 2, gauge assembly 60 is a laminate formed from a first resistive/conductive polymeric elongate member 62 laminated to the first side of elongate insulating member 64. Laminated to the second side of elongate insulating member 64 is a second resistive/conductive polymeric elongate member 66. Molded into the first end of first resistive/conductive polymeric elongate member 62 is the first end 68 (shown in phantom) of conductor 70. The embedded end 68 of conductor 70 will have a portion in electrical contact with first resistive/conductive polymeric elongate member 62. Conductor 70 will be insulated beyond the point 72 where it exits from elongate member 62. The insulation may extend into elongated resistive/conductive elongate member 62 to provide a good seal provided sufficient area of the conductor makes electrical contact with member 62. Thus, the present invention offers the opportunity for the molding of the conductor leads directly into the elongate members. At the second end of elongate member 62 is the first end 74 of conductor 76. As shown in phantom, first end 74 is embedded in the second end of elongate member 62. Conductor 76 exits elongate member 62 at interface 78 and then extends through insulating elongate member 64 exiting the top of insulating elongate member 64 at point 80. Again, beyond point 80 conductor 76 should be insulated. It is not necessary to embed conductor 76 in insulating member 64, however, doing so provides a very durable construction. Similarly, embedded in the first end of second resistive/conductive polymeric elongate member 66 is first end 82 (shown in phantom) of conductor 84. Again, conductor 84 is preferably insulated where it extends beyond point 90 the juncture with the top of elongate member 66. A sufficient portion of lead 84 at first end 82 is exposed to provide electric contact with elongate member 66. Thus, the first end of elongate member 62 is connected to a first terminal of voltage source 86 via conductor 70 and the second end of elongate member 62 is connected to a second terminal of voltage source via conductor 76. The first end of elongate member 66 is connected to a terminal of voltage indicator 88 via conductor 84. Conductor 70 also connects the second terminal of the voltage indicator 88 with the first end of elongate member 62.

Figure 3:
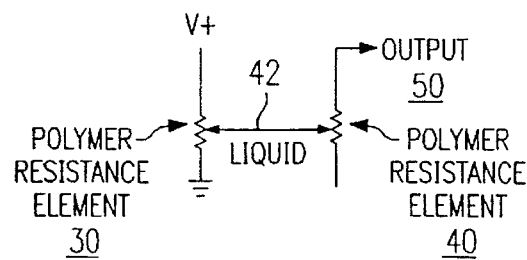
FIG. 3, is a simplified electrical circuit of FIG. 1.

FIG. 3 is a simplified equivalent circuit for the gauges shown in FIGS. 1 and 2. In FIG. 3, like numbers refer to like elements in FIG. 1. Corresponding elements in FIG. 2 are not indicated in FIG. 3 but should be readily understood by those skilled in the art.

FIG. 2 represents a general configuration which can be widely adapted to a variety of applications. For example, when a tank is made from a insulating plastic material, conductor 76 could be molded into a baffle extending into the tank which would be in contact with fluid in the tank. Thereafter elongate members 62 and 66 could be adhered to the baffle and elongate member 62 connected to first end 74 of embedded conductor 76. The conductors 76, 70 and 84 could then be extended through the tank wall during final completion of the tank. Alternatively, gauge assembly 60 could be made as a separate component and mounted in a tank during production. The present gauge has the versatility of utilizing a portion of an insulating tank as part of the gauge assembly. In the embodiments of the invention illustrated in FIGS. 1, 2 and 3, when immersed in partially conductive fluids, the gauge output would be approximately 0.5 of the applied voltage times the percent of submerged length. Thus, it is preferred that the receiving apparatus, e.g., a voltage indicator should have a high impedance input to function properly with this embodiment.

The resistive/conductive polymeric elongate members are constructed of an electrically conductive polymeric material. Suitable resistive/conductive polymeric materials include thermoplastic polymeric polyesters or other thermoplastics containing carbon fibers or carbon particles. In the preferred embodiment of the 3-wire type gauge, the resistive/conductive polymeric elongate members are made from a thermoplastic polyester containing carbon fibers. A suitable material is available from DuPont under the tradename Rynite® CR509, BK570 which has the properties as set forth below.

| Property | Test Condition | Test Method ASTM | Units | Values |
| --- | --- | --- | --- | --- |
| Tensile Strength | 23° C. | D638 | MPa (kpsi) | 55.0 (8.0) |
| | 93° C. | | | 41.4 (6.0) |
| Elongation at Break | 23° C. | D638 | % | 0.5 |
| | 93° C. | | | 1.2 |
| Compressive Strength | 23° C. | D695 | MPa (Kpsi) | 100.0 (14.5) |
| Flexural Modulus | 23° C. | D790 | GPa (kpsi) | 15.2 (2200) |
| | 93° C. | | | 5.5 (800) |
| Heat Deflection Temp. | 66 psi | D648 | °C. | 247 |
| | 264 psi | | | 221 |
| Thermal Conductivity | 23° C. | | (w/m-K) | 3.0 |
| Volume Resistivity | 23° C. | | ohm-cm | 15 |
| Surface Resistivity | 23° C. | D257 | ohm/sq | $3 \times 10^4$ |
| Shrinkage Flow Direction | 23° C. | D955 | % | 0.36 |
| Transverse Direction | | | | 0.44 |
| Specific Gravity | 23° C. | D792 | | 1.79 |

Processing Conditions:
Melt Temperature - 285–315° C. (545–605° F.)
Drying Conditions:
250° F. for 2–4 hours, Dewpoint less than 0° F. (See RYNITE ® Drying Guide) Material must be dried to less than 0.02% moisture before processing.

Another suitable material is available from DuPont under the trade designation SC500MCS which has the properties set forth below.

| Property (23° C.) | Test Method ASTM | Units | Values |
| --- | --- | --- | --- |
| Flex Strength | D790 | MPa (Kpsi) | 92.0 (13.4) |
| | | Kg/cm² | 938 |
| Tensile Strength | D638 | MPa (kpsi) | 62.0 (9.0) |
| | | Kg/cm² | 630 |
| Elongation at Break | D638 | % | 0.6 |
| Flex Modulus | D790 | GPa (kpsi) | 10.0 (1450) |
| | | Kg/cm² | 101,500 |
| Tensile Modulus | D638 | GPa (kpsi) | 20.6 (3000) |
| | | Kg/cm² | 210,000 |
| Thermal Conductivity | In plane | (w/m-K) | >20 |
| | Through plane | | 3.4 |
| Volume Resistivity | | ohm-cm | 0.05 |
| Specific Gravity | D792 | | 1.82 |
| HDT 1.8 MPa (264 psi) | D648 | °C. (°F.) | 246 (475) |

Drying Conditions:
250° F. for 2–4 hours, Dewpoint less than 0° F.

Another aspect of these conductive polymeric materials is that they can provide useful resistance values in relatively large cross sections, thus providing superb mechanical strength without the need for additional structures. This is in stark contrast to thin wire iron/nickel alloy resistive elements, which do not provide such structural integrity over a wide range of resistance values, are fragile and also easily corroded. The selection of the above materials is a function of the geometry selected, and the desired resistance to be obtained over the gauge range. Preferably, the polymeric material and the geometry of each elongate member as well as the distance between the elongate members is selected such that the gauge assembly will have a range of resistance over the length of the resistive/conductive members compatible with voltage indicators currently in use. In this way, the electrical components external to the gauge will not have to be specifically tailored for the gauge, thus requiring no conversion or modification of electrical components. Useful resistive values for the gauge depend upon the conductivity of the fluid being measured. The less the conductivity of the fluid to be measured, the higher the impedance needs of the gauge.

It is not necessary for the elongated resistive/conductive members to have the same electrical properties, but they can be the same. For example, both could be of the same material and the same size, they may be of the same material and different sizes, or they may be of different materials.

Testing of a prototype of the gauge of the 3 wire voltage divider type shown in FIG. 1, shows that resistive/conductive polymer elongate members which were each of square cross section 0.1 inch on a side (0.01 sq. in. cross section) and 6.5 inches in length made of Rynite® CR509, BK570 set with centers spaced 0.5 inches apart provided good results when the fluid measured was tap water, and a mixture of 80% denatured alcohol and 20% tap water.

Another aspect is that the elongate resistive polymeric member may be tailored to the cross-section of the tank. Thus, if the tank is of a uniform cross-section, the resistive elements can be of uniform cross-section and resistance per unit or area. Thus, an accurate read-out of the fluid contained in the tank will be provided. Alternatively, when the tank is of non-uniform cross-section, the resistance of the elongate electrical resistive member or members can be controlled by configuring the elongate polymeric member or member such that the resistance profile of the elongate polymeric member or members correspond to the volume profile in the tank. This may be done in one of two ways: by the non-uniform loading of carbon in the resistive polymeric member to vary the resistance along the member as desired or, to vary the cross-sectional area of an elongate polymeric member of the uniform volume resistivity.

In another embodiment of the present invention the gauge assembly may be simplified when the media to be measured is a highly conductive fluid. Such fluids include: battery acid, strong acids and bases. FIG. 4 shows a gauge assembly 100, commonly referred to as a two-wire gauge assembly, because there are two wires connected to the gauge assembly. Gauge assembly 100 is comprised of a base 102 with two passageways 104 and 106. Passing through passageways 104 and 106 are electrical conductors 108 and 110. One end of electrical conductor 108 is connected to terminal 112 and the other end is connected to connector 114. One end of electrical conductor 110 is connected to terminal 116 and the other end is connected to connector 118. The connector 114 is connected to the first end of first resistive/conductive polymeric elongate member 120. Connector 118 is connected to the first end of second resistive/conductive polymeric elongate member 122. Elongate members 120 and 122 are connected to and extend from base 102 into highly conductive fluid 124. Base 102 may be connected to the tank (not shown) by any suitable means such as threaded surface 126. Other useful connection methods include cam locks, bayonet connectors, and bolts or screws. A baffle 128 may optionally be connected to base 102 and extend along elongate members 120 and 122. Baffle 128 may have one or more holes 129 along its length to permit passage of fluid. The purpose of the baffles is to minimize erratic readings due to movement of fluid in the tank. Baffle 128 is optional. Baffle 128 may also serve as a ground shield. Current indicator 130 is connected to the first end of the second elongate member 122 and electrically connected to a voltage source 132. The other terminal of voltage source 132 is connected to the first end of first elongate member 120. FIG. 4B is a simplified schematic of an equivalent circuit for the gauge shown in FIG. 4.

Alternatively, the leads from terminals 116 and 112 may be connected to a voltage indicator as illustrated schematically in FIG. 4A where like numbers refer to like elements. In FIG. 4A the voltage source is indicated as 134 and a resistor 136 and a voltage indicator 138 are also provided in the circuit.

FIG. 5 shows a cut-away view of a tank 150, positioned inside the tank is baffle plate 152. Baffle plate 152 contains a plurality of apertures 154 which permits fluid to travel between the plate. Baffle plate 152 tends to dampen movement of fluid within the tank. Where the baffle plate 152 is made of a non-conductive material such as an insulating plastic the simplicity of the present becomes readily apparent. First resistive/conductive polymeric elongate member 156 may be mounted on one side of the baffle plate 152 and the second resistive/conductive polymeric elongate member 158 shown in phantom can be mounted on the other side of the baffle plate 152. Conductor 160 is embedded in the first elongate member 156 and passes through tank wall 162. Conductor 164 is electrically connected to second elongate member 158 and also passes through tank wall 162. There, conductors 160 and 164 are connected to a voltage indicator or a current indicator as discussed with reference FIGS. 4 and 4A. Thus, in the fabrication of tanks with non-conductive baffles or totally of non-conductive material the gauge can be made an integral part of the tank for superior strength and economical manufacture.

In yet another embodiment, the gauge of the present invention may be formed by using a gauge element in combination with a conductive wall member of a tank. FIG. 6 shows a cross sectional view of a tank with conductive wall 200 containing a conductive fluid 202. Wall 200 contains an aperture 204 through which gauge element 206 extends. Gauge element 206 is comprised of a base 208 defining an aperture 210. Base 208 is provided with the means for attaching it to tank wall 200 such as threaded surface 212. In one embodiment base 208 may be received by a insulating block 214 connected to tank wall 200. Alternatively, where base 208 is made from an insulating material itself there is no need to provide an insulating block 214. Preferably base 208 is made of an insulating material. Extending through aperture 210 is conductor 216. The first end of conductor 216 is connected to terminal 218 and the second end is connected to connector 220. Connector 220 is connected to elongate resistive/conductive polymeric member 222. Elongate member 222 as shown can be of a non-uniform cross section of a material having uniform volume resistance. As can be seen, the cross-section of tank 200 is not uniform. Segment 224 is of smaller cross-section than section 226 of elongate member 222. Thus, the resistance profile in elongate member 222 conforms with variations in tank volume at different fluid levels. Conductive tank wall 200 is connected to terminal 228 which is connected to one side of the voltage source 130. The other side of voltage source 130 is connected to current indicator 132. The other side of current indicator 132 is connected to elongate member 222 via conductor 210. FIG. 6A is a simplified equivalent circuit to the circuit shown in FIG. 6. Like numbers in FIG. 6A refer to like elements in FIG. 6. The gauge element may also be used with a voltage indicator.

The embodiments shown in FIGS. 4, 4A, 4B, 5, 6 and 6A are useful with fluids which are highly conductive. The gauges shown in FIGS. 1 and 2 will also work with highly conductive fluids provided that the resistance values elongate members are appropriately selected. In the two-wire gauges it has been observed that low resistance polymeric elongate members having a volume resistivity of about 0.05 ohm-cm. or less appear to work better than materials with higher volume resistivity and thus are preferred. However, more resistive elements also work.

A significant advantage of the gauges of the present invention is that a small amount of contamination will not change the reading materially as it would in other gauges. This results from the fact that the area being used for contact i.e. the working surface of the device has a much greater area of contact than the typical gauge and float mechanism with a wiper arm.

The present invention can be used in a great number of different applications and methods of construction. For example, the resistive/conductive polymeric elongate members can be made an integral part of non-conductive plastic tanks during the molding process. Alternatively, the elongate members can simply be adhered to the sides of the tank walls or baffles during construction. The gauge assembly may be added to the tank after completion, and the length of resistive member can be easily varied to be used in tanks of different depths.

The present invention also offers ability to provide an unique safety feature. FIG. 7 shows a gauge assembly 300 having a first resistive/conductive polymeric elongate member 302 laminated to the first side of the first insulating member 304. Laminated to the second side of the first insulating member 304 is first side of second resistive/conductive polymeric elongate member 306. Laminated to the second side of the second elongate member 306 is second insulating member 308. Laminated to the second side of said second insulating member 308 is electrostatic plate 310. Conductor 312 is connected to the first end of the first elongate member 302 by embedding first end 314 of the conductor 312 in first elongate member 302. Conductor 316 is connected to the first end of second elongate member 308 by embedding the first end 318 of conductor 316 in second elongate member 308. Conductors 312 and 316 may be connected to electric circuitry as discussed previously. Further, this embodiment can be modified to provide a third conductor to the bottom of either elongate resistive/conductive member to be used in a three wire gauge configuration.

Electrostatic discharge plate 310 acts as an avenue for electrostatic discharge and preferably has sufficient conductivity to dissipate electrostatic energy. Preferably it extends the entire depth of the tank. It can be connected to the tank for the purpose of providing a ground path running all the way through the tank. While electrostatic discharge plate 310 does not form part of the gauge, it does provide safety provided its resistance is low enough to provide electrostatic discharge. This is a desirable feature for tanks containing flammable fluids.

What is claimed is:

1. A floatless gauge assembly to be used in conjunction with a voltage source and voltage indicator or a current source and current indicator for measuring the level of a fluid in a conductive tank having a non-uniform horizontal cross sectional area, comprising:

a base; and an elongate electrically resistive/conductive polymeric member connected at one end thereof to said base and extending therefrom, said resistive/conductive polymeric member having one end thereof electrically connected to a first terminal, said elongate member having a resistance profile corresponding to the variations in horizontal cross sectional area of said tank.

2. Apparatus as recited in claim 1 wherein said elongate resistive/conductive polymeric member is made of a polymeric conductive material having a volume resistivity of between 0.03 and 164 ohms-cm.

3. Apparatus as recited in claim 1 wherein said elongate resistive/conductive polymeric member has a non-uniform resistance along its length and a constant cross sectional area.

4. Apparatus as recited in claim 2 wherein said elongate resistive/conductive polymeric member has a uniform resistance profile along its length and a varying cross sectional area.

5. A tank having a floatless gauge comprising:

(a) a tank made of conductive material for containing a conductive fluid, said tank having a non-uniform horizontal cross sectional area;

(b) a terminal attached to said tank;

(c) a base made of insulating material attached to said tank;

(d) an elongate electrically resistive/conductive polymeric member connected at one end thereof to said base such that it is insulated from said tank and extending into said tank such that it can be contacted by liquid in said tank, said elongate member having a resistance profile corresponding to the variations in horizontal cross sectional area of said tank; and (e) a second terminal connected to said polymeric member for connection to a voltage indicator.

6. Apparatus as recited in claim 5 wherein said elongate resistive/conductive polymeric member is made of a polymeric conductive material having a volume resistivity of between 0.03 and 164 ohms-cm.

7. Apparatus as recited in claim 5 wherein said elongate resistive/conductive polymeric member has a non-uniform resistance profile along its length and a constant cross sectional area.

8. Apparatus as recited in claim 6 wherein said elongate resistive/conductive polymeric member has a non-uniform resistance profile along its length and a varying cross sectional area.

9. The apparatus of claim 1 wherein said elongate electrically resistive/conductive member is a thermoplastic polyester containing carbon fibers.

10. The apparatus of claim 2 wherein said elongate electrically resistive/conductive member is a thermoplastic polyester containing carbon fibers.

11. The apparatus of claim 3 wherein said elongate electrically resistive/conductive member is a thermoplastic polyester containing carbon fibers.

12. The apparatus of claim 4 wherein said elongate electrically resistive/conductive member is a thermoplastic polyester containing carbon fibers.

13. The apparatus of claim 5 wherein said elongate electrically resistive/conductive member is a thermoplastic polyester containing carbon fibers.

14. The apparatus of claim 6 wherein said elongate electrically resistive/conductive member is a thermoplastic polyester containing carbon fibers.

15. The apparatus of claim 7 wherein said elongate electrically resistive/conductive member is a thermoplastic polyester containing carbon fibers.

16. The apparatus of claim 8 wherein said elongate electrically resistive/conductive member is a thermoplastic polyester containing carbon fibers.

* * * * *